United States Patent
Watanabe (10) Patent No.: US 7,034,969 B2
(45) Date of Patent: Apr. 25, 2006

(54) DIVIDED ONE-DIMENSIONAL SOLID-STATE IMAGING DEVICE, METHOD OF CONTROLLING ONE-DIMENSIONAL SOLID-STATE IMAGING DEVICE, AND IMAGE READING APPARATUS AND METHOD USING THE SAME

(75) Inventor: Kouji Watanabe, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 822 days.

(21) Appl. No.: 09/918,727

(22) Filed: Aug. 1, 2001

(65) Prior Publication Data

US 2002/0015194 A1    Feb. 7, 2002

(30) Foreign Application Priority Data

Aug. 1, 2000   (JP)  ............................ 2000-232823
Aug. 3, 2000   (JP)  ............................ 2000-235315

(51) Int. Cl.
*H04N 1/46*    (2006.01)
*H04N 1/04*    (2006.01)
*H04N 5/335*    (2006.01)

(52) U.S. Cl. ...................... 358/513; 358/512; 358/514; 358/506; 358/482; 358/483; 348/323; 250/208.1

(58) Field of Classification Search ............... 358/483, 358/482, 512–514, 487, 506, 505, 474, 496, 358/497; 348/320–324, 237, 260, 311, 266, 348/249; 250/208.1, 239, 214.1; 382/312, 382/318, 319; 355/41, 40; 257/291–293

See application file for complete search history.

(56) References Cited

U.S. PATENT DOCUMENTS

| | | | | |
|---|---|---|---|---|
| 5,036,397 A | * | 7/1991 | Nagabusa | 348/311 |
| 5,272,113 A | * | 12/1993 | Quinn | 156/80 |
| 5,363,216 A | * | 11/1994 | Kim | 358/482 |
| 5,640,251 A | * | 6/1997 | Tone et al. | 358/482 |
| 5,784,178 A | * | 7/1998 | Tsai et al. | 358/482 |
| 5,912,746 A | * | 6/1999 | Cilke et al. | 358/482 |
| 6,721,010 B1 | * | 4/2004 | Chen et al. | 348/322 |

FOREIGN PATENT DOCUMENTS

| | | |
|---|---|---|
| JP | 05-048841 | 2/1993 |
| JP | 2000-69252 B1 | 3/2000 |
| JP | 2000-006925 | 1/2001 |

* cited by examiner

*Primary Examiner*—Cheukfan Lee
(74) *Attorney, Agent, or Firm*—Sughrue Mion, PLLC (57) ABSTRACT

The divided one-dimensional solid-state imaging device includes photodiode arrays having photodiodes for individual pixels arrayed in a line, output transistors for outputting electric charges from the respective photodiodes and transfer paths for transferring the outputted electric charges to output terminals. In the imaging device, the photodiode arrays is divided into a plurality of sections differing in the number of pixels in a photodiode arraying direction, the respective divided sections connecting to the corresponding ones of the transfer paths and the output terminals, and pixel rows in the respective divided sections are read out in parallel at the same time from the output terminals corresponding to the respective divided sections.

13 Claims, 7 Drawing Sheets

LINE CCD: TOTAL 5000 PIXELS
FIRST PIXEL — 5000th PIXEL

FILM TYPE → PRINT SIZE

FIG. 3A
135 F → L SIZE
NUMBER OF PIXELS: 1741

FIG. 3B
135 F → 8 × 10 INCH SIZE
NUMBER OF PIXELS: 3480

FIG. 3C
135F → PANORAMIC SIZE
NUMBER OF PIXELS: 1225

FIG. 3D
135 F → 89 mm-WIDTH SIZE
NUMBER OF PIXELS: 1559

FIG. 3E
135 F → 89mm-WIDTH PANORAMIC SIZE
NUMBER OF PIXELS: 996

FIG. 3F
135 F → A4 SIZE
NUMBER OF PIXELS: 4545

FIG. 3G
135 F → L SIZE
NUMBER OF PIXELS: 3892

DIVIDED ONE-DIMENSIONAL SOLID-STATE IMAGING DEVICE, METHOD OF CONTROLLING ONE-DIMENSIONAL SOLID-STATE IMAGING DEVICE, AND IMAGE READING APPARATUS AND METHOD USING THE SAME

BACKGROUND OF THE INVENTION

1. Field of the Invention

This invention generally relates to a divided one-dimensional solid-state imaging device, a method of controlling a one-dimensional solid-state imaging device, and an image reading apparatus and method using the same. More particularly, this invention relates to a divided one-dimensional solid-state imaging device that is constructed by dividing photodiodes arrayed one-dimensionally in photodiode arrays of a one-dimensional solid-state imaging device such as a line CCD sensor and a line MOS type sensor into a plurality of blocks in a photodiode arraying direction; an image reading technique for photoelectrically reading an original image recorded on a photographic film or the like by the divided one-dimensional solid-state imaging device and the one-dimensional solid-state imaging device, that is, a method of controlling the divided one-dimensional solid-state imaging device and the one-dimensional solid-state imaging device for use in reading the image; and an image reading apparatus and method using the image reading technique.

2. Description of the Related Art

Conventionally, an image recorded on a photographic film (hereinafter referred to as "film") such as a negative film and a reversal film is printed on a photosensitive material (printing paper) mainly by so-called direct exposure (analog exposure). In the direct exposure, an image on a film is projected on a photosensitive material and the surface thereof is exposed.

On the other hand, a printing apparatus that prints images by digital exposure, that is, a digital photoprinter has recently been developed which photoelectrically reads images recorded on a photographic film, converts the read images to digital signals, performs various image processing operations on the digital signals to provide image data for recording, and then scans and exposes a photosensitive material by means of a recording light modulated according to the image data to thereby record an image (latent image), which is outputted as a finished print.

Such a digital photoprinter includes as basic components a scanner (an image reading apparatus) that photoelectrically reads images recorded on a film, an image processing apparatus that performs image processing operations on the read images to obtain output image data (exposure conditions), a printer (an image recording apparatus) that scans and exposes a photosensitive material in accordance with the image data outputted from the image processing apparatus to record a latent image, and a processor (a developing apparatus) that performs developing operations on the exposed photosensitive material to output a print.

The scanner (the image reading apparatus) causes a reading light emitted from a light source to be radiated upon the film to obtain a projected light carrying a film image, focuses the projected light to form an image on an image sensor such as a CCD sensor by means of an image-formation lens and photoelectrically converts the focused light to thereby read an image, performs various image processing operations as necessity requires, and transmits the image as film image data (image data signal) to the image processing apparatus. The image processing apparatus determines the image processing conditions according to the image data read by the scanner, performs image processing operations according to the determined conditions, and transmits the resulting image data as output image data (exposure conditions) for recording an image to the printer.

If the printer is a device that scans and exposes the photosensitive material by means of a light beam; it modulates the light beam according to the image data transmitted from the image processing apparatus, deflects the light beam in a main scanning direction, and transports a photosensitive material in a sub-scanning direction perpendicular to the main scanning direction to thereby expose (print) the photosensitive material by the light beam carrying an image to form a latent image. The processor then performs processing operations such as development and the like according to the photosensitive materials to provide a print (photograph) of a reproduced film image.

Examples of image reading methods executed by the digital photoprinter are a so-called sheet reading method wherein a reading light is radiated upon the whole surface of one frame recorded on a film and the projected light is photoelectrically read by an area sensor, and a slit scan reading method wherein a line sensor is used to cause a slit-like reading light in parallel with a line sensor extending direction (main scanning direction) to radiate a film and transport the film (or move an optical system) in a sub-scanning direction perpendicular to the main scanning direction to thereby read the whole surface of the one frame. The slit scan reading method using the line sensor is more advantageous than the sheet reading method from the viewpoint of the cost because the area sensor has a number of CCD cells and photoelectric conversion elements and is therefore usually expensive, and having many CCD cells therein causes problems (e.g. the correction of defective pixels).

Figure 8:
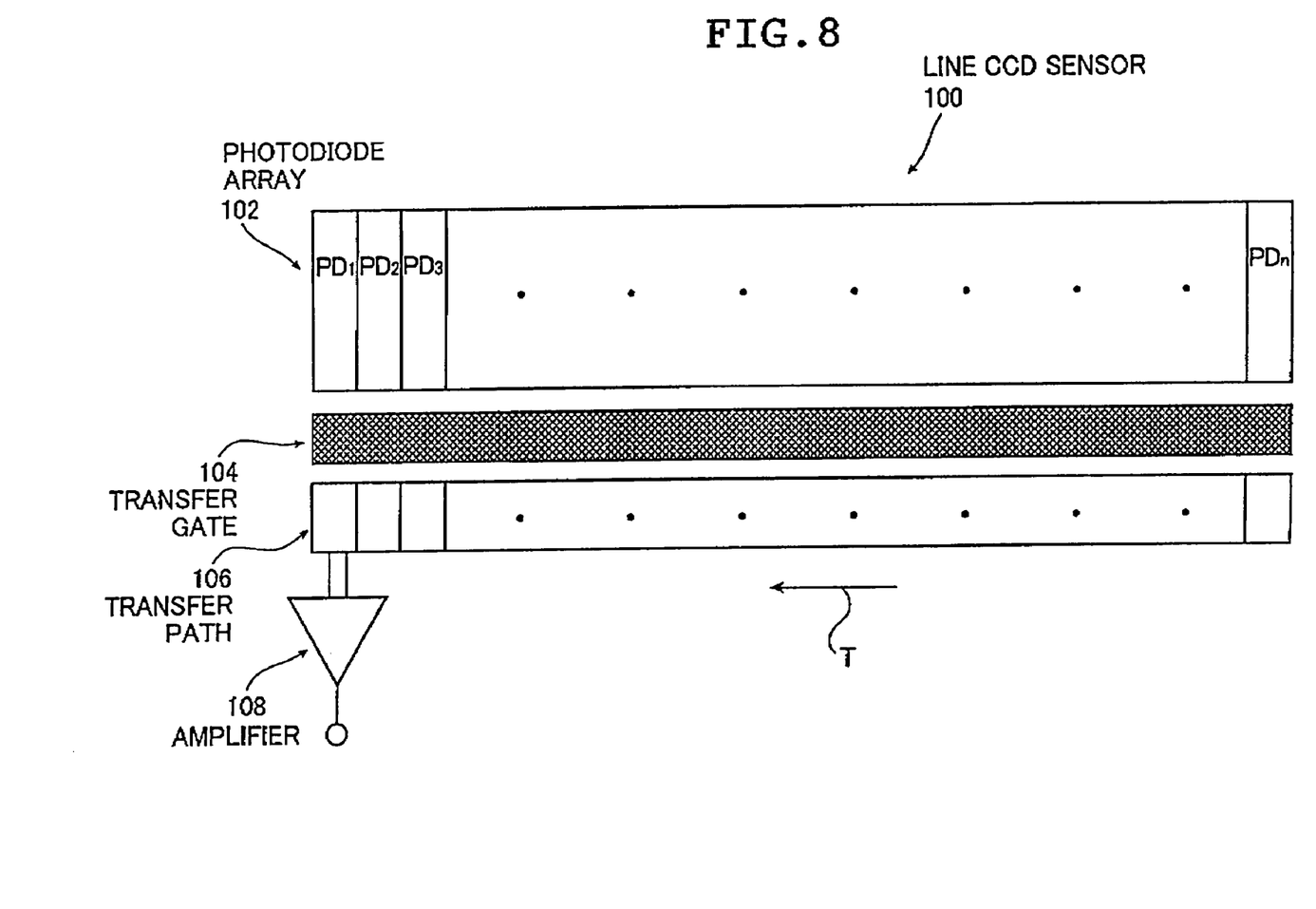
FIG. 8 is a conceptual diagram showing the structure of a prior art CCD line sensor.

FIG. 8 is a schematic block diagram showing a prior art line CCD sensor.

As shown in FIG. 8, a line CCD sensor 100 is comprised of a photodiode array 102, a transfer gate 104, a transfer path 106, and an amplifier 108.

In the photodiode array 102, photodiodes PD1-PDn for storing electric charges according to the quantity of incident light for each pixel are arranged in a line from the first pixel to the nth pixel. The electric charges stored in the respective photodiodes PD of the photodiode array 102 are transmitted to the transfer path 106 via the transfer gate 104. The electric charges are then sequentially transferred on the transfer path 106 on a pixel-by-pixel basis in a direction T of an arrow in FIG. 8.

If all the n pixels are sequentially transferred and are read out by the amplifier 108 on a pixel-by-pixel basis as stated above, the time required for reading is expressed as p×n where p is the time required for transferring one pixel. The time required for reading should be reduced in order to improve the processing efficiency.

Accordingly, Japanese Patent Application Laid-Open No. Hei 5-48841 discloses a line CCD sensor in which each of photodiode arrays is divided into a plurality of sections in a scanning direction, and the respective sections connect to corresponding transfer gates, transfer paths and amplifiers so that pixels can be read out from the respective sections at a high speed.

The invention disclosed in this publication, however, is characterized by dividing the photodiodes in the scanning direction, but is not related to the method of dividing, the method of reading, or the like. It is therefore impossible to achieve the satisfactory reading efficiency by a line CCD sensor and read some types of originals at a high speed.

On the other hand, in Japanese Patent Laid-Open Publication No. 2000-69252, the assignee of the present invention has proposed an image reading apparatus that is provided with an electric charge discharge drain and an electric charge discharge gate to discharge extra electric charges and change the number of pixels to be read as necessity requires so as to eliminate the need for reading out all the pixels to thereby improve the reading efficiency.

Although the invention disclosed in this publication improves the pixel reading efficiency, a CCD itself is expensive since it must be provided with circuits and the like for discharging extra electric charges.

SUMMARY OF THE INVENTION

It is therefore the first object of the present invention to provide a divided one-dimensional solid-state imaging device such as a divided CCD line sensor and a divided line MOS type sensor wherein photodiode arrays are divided in a scanning direction, the divided one-dimensional solid-state imaging device being capable of reducing the time required for reading and reading at a high speed by reading pixels simultaneously through a plurality of amplifiers according to types of documents to thereby improve the processing capability of an image reading apparatus; a method of controlling the divided one-dimensional solid-state imaging device; and an image reading apparatus using the divided one-dimensional solid-state imaging device.

It is the second object of the present invention to provide a method of controlling a one-dimensional solid-state imaging device that is capable of reducing the time required for scanning a photographic film and the cycle of reading pixels in one line without raising the cost of the solid-state imaging device such as a CCD to thus improve the performance of the apparatus, and an image reading method using the one-dimensional solid-state imaging device.

In order to attain the first object described above, the first aspect of the present invention provides a divided one-dimensional solid-state imaging device comprising: photodiode arrays having photodiodes for individual pixels arrayed in a line; output transistors for outputting electric charges from the respective photodiodes in the photodiode arrays; and transfer paths for transferring the electric charges supplied from the output transistors to output terminals, wherein each of the photodiode arrays is divided into a plurality of sections differing in the number of pixels in a photodiode arraying direction, the respective sections connecting to the corresponding ones of the transfer paths and the output terminals; and pixel rows in the respective sections are read out in parallel at the same time from the output terminals corresponding to the respective sections.

Preferably, the one-dimensional solid-state imaging device is based on a signal transfer system; the output transistors constitute a transfer gate; and the transfer paths are analog shift registers.

Preferably, the one-dimensional solid-state imaging device is a line CCD sensor.

Preferably, the one-dimensional solid-state imaging device is based on an addressing system; the output transistors are switching transistors; and the transfer paths are digital shift registers that select the switching transistors for the photodiodes from which the electric charges are outputted.

Preferably, the one-dimensional solid-state imaging device is an MOS type sensor; the output transistors are MOS transistors; and the transfer paths are digital shift registers that select the MOS transistors for the photodiodes from which the electric charges are outputted.

In order to attain the first object described above, the second aspect of the present invention provides a method of controlling a divided one-dimensional solid-state imaging device comprising: photodiode arrays having photodiodes for individual pixels arrayed in a line; output transistors for outputting electric charges from the respective photodiodes in the photodiode arrays; and transfer paths for transferring the electric charges supplied from the output transistors to output terminals, wherein each of the photodiode arrays is divided into a plurality of sections differing in the number of pixels in a photodiode arraying direction, the respective sections connecting to the corresponding ones of the transfer paths and the output terminals; and pixel rows in the respective sections are read out in parallel at the same time from the output terminals corresponding to the respective sections, the method comprising the steps of: concentrating the sections comprised of a small number of pixels at one part in an arraying direction of the photodiode arrays; and using only the sections with a small number of pixels concentrated at one part in the arraying direction for reading of an image projected in a narrow area.

In order to attain the first object described above, the third aspect of the present invention provides an image reading apparatus wherein: a divided one-dimensional solid-state imaging device is used as an image reading section that photoelectrically reads an image recorded on a photographic film, the divided one-dimensional solid-state imaging device comprising: photodiode arrays having photodiodes for individual pixels arrayed in a line; output transistors for outputting electric charges from the respective photodiodes in the photodiode arrays; and transfer paths for transferring the electric charges supplied from the output transistors to output terminals, wherein each of the photodiode arrays is divided into a plurality of sections differing in the number of pixels in a photodiode arraying direction, the respective sections connecting to the corresponding ones of the transfer paths and the output terminals; and pixel rows in the respective sections are read out in parallel at the same time from the output terminals corresponding to the respective sections.

In order to attain the second object described above, the fourth aspect of the present invention provides a method of controlling a one-dimensional solid-state imaging device which comprises photodiode arrays having photodiodes for reading individual pixels arrayed in a line, a transfer gate for outputting electric charges from the respective photodiodes in the photodiode array, and transfer paths, e.g., preferably analog shift registers for transferring the electric charges supplied from the transfer gate to output terminals, the method comprising the steps of: using only intermediate region of the photodiode arrays for imaging without using regions at one end side and the other end side of the photodiode arrays; and reading out pixels first from the region at the one end side and next from the intermediate region, and stopping reading out pixels in the region at the other end side at a point where pixels in the same number as or smaller number than pixels in the region at the one end side of the photodiodes arrays are remained, thereby eliminating need for reading out all pixels in the photodiode arrays.

Preferably, the one-dimensional solid-state imaging device is a line CDD sensor.

In order to attain the second object described above, the fifth aspect of the present invention provides a method of reading an image exposed on a photographic film, comprising the step of: reading an image by a one-dimensional solid-state imaging device controlled by a method of controlling the one-dimensional solid-state imaging device which comprises photodiode arrays having photodiodes for reading individual pixels arrayed in a line, a transfer gate for outputting electric charges from the respective photodiodes in the photodiode array, and transfer paths, e.g., preferably analog shift registers for transferring the electric charges supplied from the transfer gate to output terminals, the method comprising the steps of: using only intermediate region of the photodiode arrays for imaging without using regions at one end side and the other end side of the photodiode arrays; and reading out pixels first from the region at the one end side and next from the intermediate region, and stopping reading out pixels in the region at the other end side at a point where pixels in the same number as or smaller number than pixels in the region at the one end side of the photodiodes arrays are remained, thereby eliminating need for reading out all pixels in the photodiode arrays.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a divided one-dimensional solid-state imaging device, a method of controlling the one-dimensional solid-state imaging device, and an image reading apparatus and method using the same according to the present invention will hereunder be described in further detail with reference to the accompanying drawings.

Referring first to FIGS. 1–4, there will be described a divided one-dimensional solid-state imaging device according to the first aspect of the present invention, a method of controlling the one-dimensional solid-state imaging device according to the second aspect, and an image reading apparatus using the one-dimensional solid-state imaging device according to the third aspect of the present invention.

In the following description, a divided line CCD sensor is given as an embodiment of the divided one-dimensional solid-state imaging device according to the first aspect of the present invention. It should be understood, however, that there is no intention to limit the invention to it.

Figure 1:
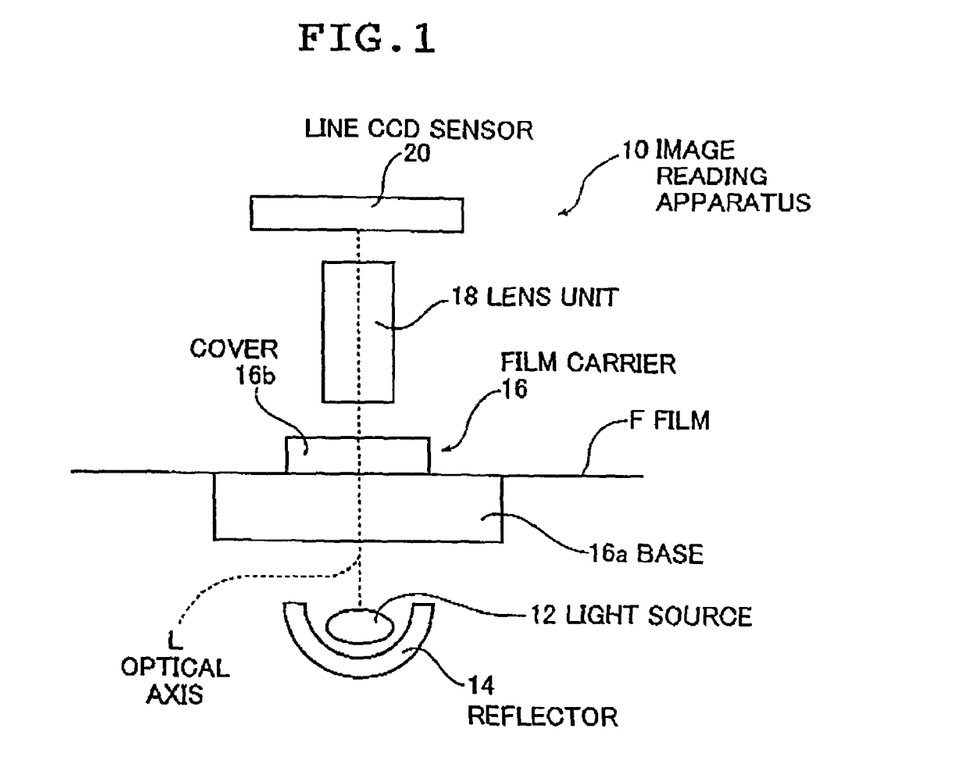
FIG. 1 is a schematic block diagram showing an embodiment of an image reading apparatus according to the present invention.

FIG. 1 is a schematic block diagram showing an embodiment of the image reading apparatus according to the third aspect of the present invention.

As shown in FIG. 1, the image reading apparatus 10 of the present embodiment is comprised of a reading optical system using a line CCD sensor.

More specifically, the image reading device 10 is comprised mainly of a light source 12, a film carrier 16, a lens unit (hereinafter referred to as "lens") 18, a divided line CCD sensor (hereinafter referred to as "line CCD sensor") 20.

The light source 12 is comprised of, for example, a metal halide lamp or a halogen lamp. A reflector 14 which is formed like a paraboloid of revolution and which transmits IR (infrared ray) is disposed such that the light source 12 is located at a focusing position. A light emitted from the light source 12 is reflected by the reflector 14, and is radiated upon a photographic film F held by the film carrier 16.

Although not illustrated, an IR cutting filter for cutting IR components of the light emitted from the light source 12, a CMY light control filter, an ND filter serving as a beam attenuating filter, a light diffusion box for diffusing the light radiated upon the photographic film F are disposed along an optical axis L of the emitted light between the light source 12 and the film carrier 16.

The photographic film F is held between a base 16a and a cover 16b of the film carrier 16 and is transported in such a manner that the surface of the photographic film F is vertical to the optical axis L.

The lens 18, on which the light transmitted through the photographic film F forms an image, and the line CCD sensor 20 located at the image-formation position are disposed along the optical axis L at the opposite side of the light source 12 across the film carrier 16 that transports the photographic film F. The line CCD sensor 20 is comprised of a three line color CCD sensor that has three lines of photodiode arrays wherein photodiodes are arranged in a line in a direction perpendicular to the film transporting direction. One of R, G and B color-separation filters is mounted at the incidence side of each line.

Figure 2:
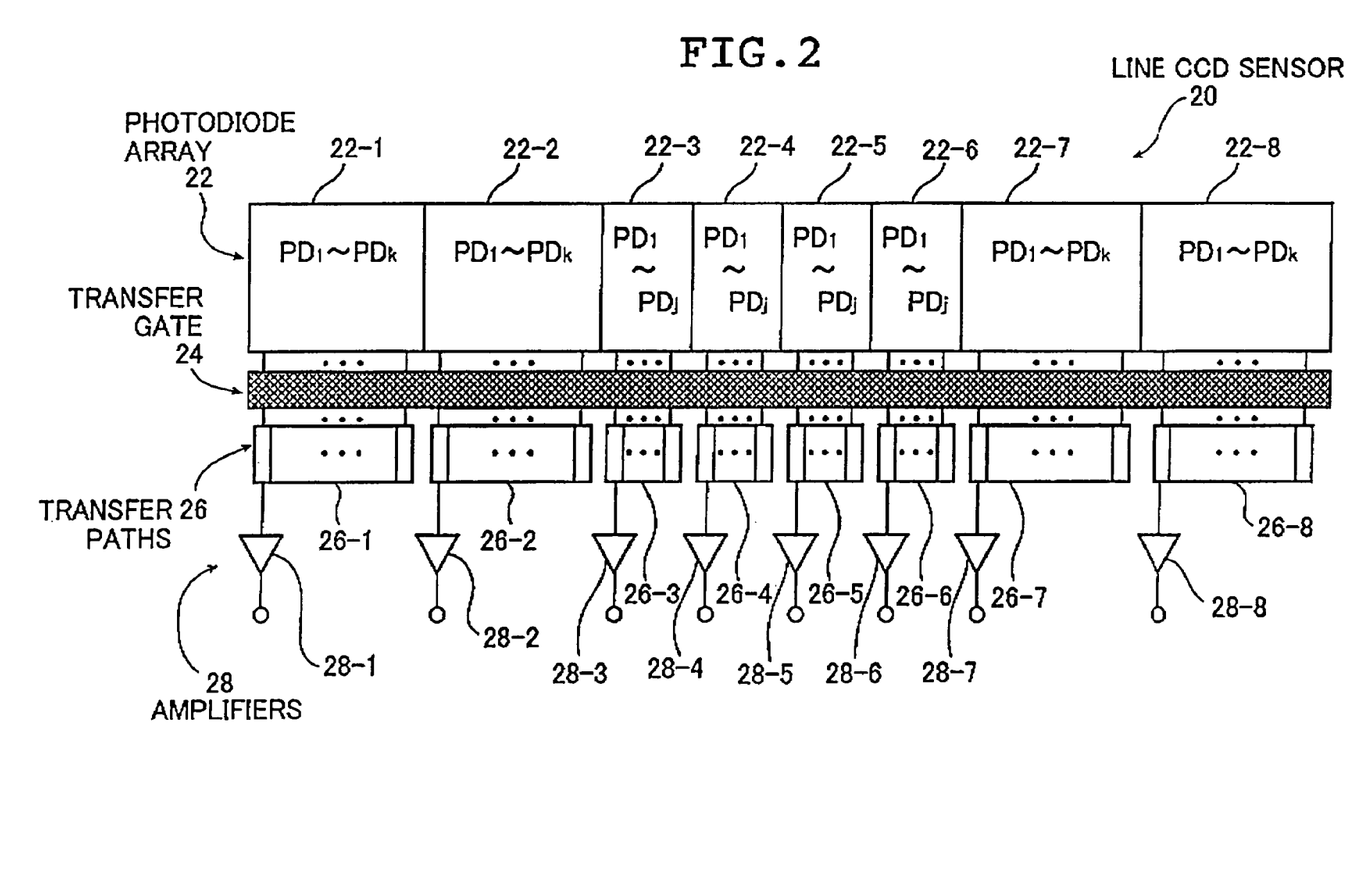
FIG. 2 is a conceptual diagram showing an embodiment of a line CCD sensor according to the present invention.

FIG. 2 conceptually shows the structure of the line CCD sensor 20. FIG. 2 shows a photodiode array in one of the three lines. The three lines are constructed in the same manner except for color-separation filters, and therefore, only a photodiode array in one line will be described hereinbelow.

As shown in FIG. 2, (one line of) the line CCD sensor 20 is comprised of a photodiode array 22, a transfer (or shift) gate 24 constituted of plural outputting (or shift) transistors, transfer paths 26, and amplifiers 28 serving as output terminals.

The photodiode array 22 includes plural (n) photodiodes PD arranged in a main scanning direction, and it is divided into eight sections 22-1 to 22-8. The intermediate four sections 22-3 to 22-6 are comprised of j photodiodes PD1–PDj. A character "j" represents the number of pixels. The four sections at both ends, that is the first two sections plus the last two sections 22-1, 22-2, 22-7, and 22-8 are comprised of k photodiodes PD1–PDk. The total number of pixels in the photodiode array 22 is represented by the following expression: $n=4 \times k + 4 \times j$. Since "k" is equal to or larger than "j", the number of pixels in the four sections at both ends is larger than that in the intermediate four sections.

The common transfer gate 24 is connected to the respective sections 22-$i$ ($i$=1 to 8) of the photodiode array 22. The transfer paths 26-$i$ ($i$=1 to 8) and the amplifiers (output terminals) 28-$i$ ($i$=1 to 8) are provided correspondingly to the respective sections 22-$i$.

Since the respective sections 22-I are provided with the corresponding amplifiers 28-$i$ as stated above, the pixels can be read out in parallel at the same time from the respective sections 22-$i$. Therefore, if all the n pixels are to be read, the cycle of reading pixels in one line is determined based on the section comprised of a larger number of pixels k. Thus, the time required for reading the section comprised of k pixels and the cycle of reading pixels in one line are represented by the following expression: k×P where P is the time required for transferring one pixel. If the photodiode array is divided into a larger number of sections to reduce the number of pixels in each section, the cycle of reading pixels in one line can be further reduced. However, the larger the number of sections divided from the photodiode array, the larger the required number of amplifiers. This necessitates adding a large number of external circuits to raise the cost.

On the other hand, the whole photodiode array is not necessarily used when the line CCD sensor reads an image. Thus, which sections of the photodiode array should be used for imaging can be determined according to the size of an image to be projected on the CCD. More specifically, in the photodiode array, a region that is used for imaging is divided into a larger number of sections than a region that is not used for imaging. As a result, sections divided from the region that is used for imaging are each comprised of a small number of pixels and sections divided from the region that is not used for imaging are each comprised of a large number of pixels. This efficiently reduces the time required for reading pixels.

For the reasons stated above, according to the present embodiment, the intermediate region of the photodiode array 22 is divided into a larger number of sections than regions at both ends of the photodiode array 22, and only the sections each comprised of j pixels are used to read an image to be projected in a narrow area on the CCD. This shortens the cycle of reading pixels in one line to j/n×100[%].

The photodiodes PD in the photodiode array 22 of the illustrated line CCD sensor 22 are used to receive a projected light carrying an original image by separating it into different colors and to photoelectrically convert it on a pixel-by-pixel basis to store electric charges.

To simplify the explanation, each photodiode PD of the photodiode array 22 in the illustrated line CCD sensor 20 reads one pixel of an original image, but it should be understood that there is no intention to limit the present invention to it. For example, a plurality of photodiodes PD may read one pixel of the original image.

The transfer gate 24 of the illustrated line CCD sensor 20 is used to output the electric charges stored in the respective photodiodes PD of the photodiode array 22 to the transfer paths 26. For example, the transfer gate 24 is comprised of respective output or shift transistors for outputting electric charges.

The transfer paths 26 are used to transfer the electric charges supplied from the transfer gate (constituted of output transistors) to the amplifiers functioning as the output terminals. For example, the transfer paths 26 are comprised of analog shift registers.

It should be noted that any types of the line CCD sensor 20 may be used insofar as they are one-dimensional solid-state imaging devices based on any given signal transfer system; e.g. a frame transfer system CCD or an inline transfer system CCD.

There will now be described the operation of the image reading apparatus and the method of controlling the divided one-dimensional solid-state imaging device according to the second embodiment of the present invention.

First, an operator sets the photographic film F between the base 16$a$ and the cover 16$b$ of the film carrier 16, and mounts the film carrier 16 at a predetermined position of the image reading apparatus 10.

The photographic film F is scanned twice, that is, pre-scanning and fine scanning. In the pre-scanning, the photographic film F is read at a low resolution to determine the reading conditions and the image processing conditions for the fine scanning. The fine scanning is intended to acquire image data that is to be outputted as a print. The pre-scanning and the fine scanning may be performed on a frame-by-frame basis, or may be performed continuously for all frames or for a predetermined number of frames.

To read an image, the film carrier 16 feeds a frame to be read on the photographic film F to a predetermined reading position of the image reading apparatus 10. A light transmitted through the photographic film F is projected on the line CCD sensor 20 to form an image.

A COD projection area is determined according to the film type and the print size. Supposing that the number of pixels in the CCD projection area is not greater than 4×j, an image can be read by using only the intermediate four sections 22-3 to 22-6 of the photodiode array 22. At this time, the reading speed is determined based on the sections each comprised of j pixels are used for reading whereas the sections each comprised of k pixels at both ends are not used. Thus, the cycle of reading pixels in one line is determined based on the section comprised of j pixels, and the cycle of reading pixels in one line is equal to the time required for reading j pixels, which is expressed as P×j.

Figure 3A:
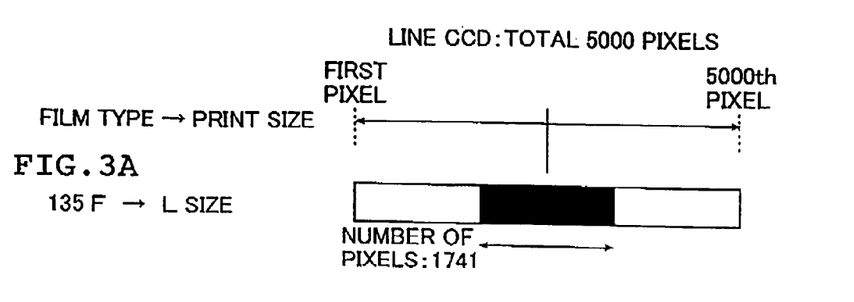
FIGS. 3A–3G are explanatory views showing a CCD projection area corresponding to the film type and the print size.

For example, if the total number of pixels (size) to be read by the line CCD sensor 20 is 5000, the type of the photographic film F is 135F and the print size is the most commonly used L size; the CCD projection area is comprised of 1741 pixels as shown in FIG. 3A.

Accordingly, if "k" is equal to 814 and "j" is equal to 436 in the case where the photodiode array 22 is divided into eight sections, the total number of pixels is represented by the following expression: 814×4+436×4=5000. Since the intermediate four sections are comprised of 436×4=1744 pixels, the intermediate four sections each comprised of j (=436) pixels cover the above-mentioned CCD projection area comprised of 436×4=1744 pixels. Therefore, an image can be read by using only these four sections having smaller number of pixels.

FIGS. 3B–3G show the number of pixels in the CCD projection areas corresponding to other combinations of film types and print sizes.

Figure 3B:
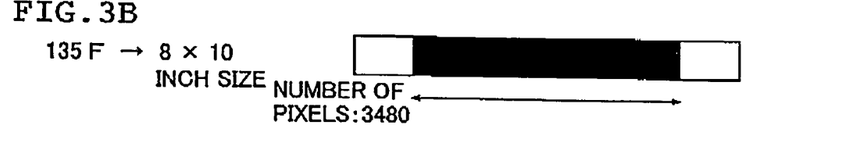

For example, as shown in FIG. 3B, even if the film type is 135F, if the print size is the 8×10-inch size, the CCD projection area in this case is comprised of 3480 pixels. Thus, all the sections must be used to read an image if the line CCD sensor divided in the above-described manner is used. In this case, the time required for reading is determined based upon the section comprised of a larger number of pixels k. In order to further reduce the time required for reading, it is necessary to change the way of dividing the photodiode array (e.g. the number of division and the number of pixels in the respective sections).

Figure 3C:
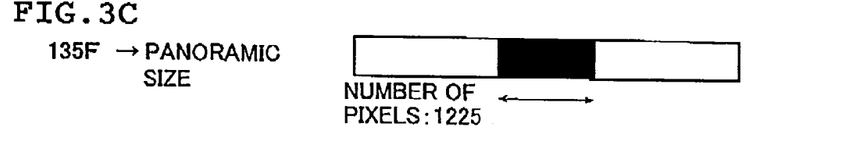
Figure 3D:
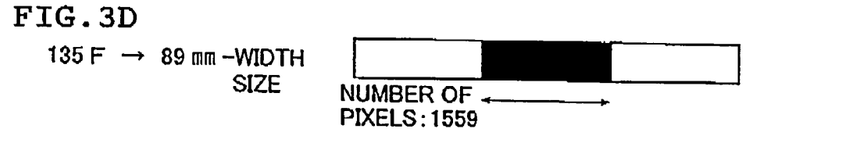
Figure 3E:
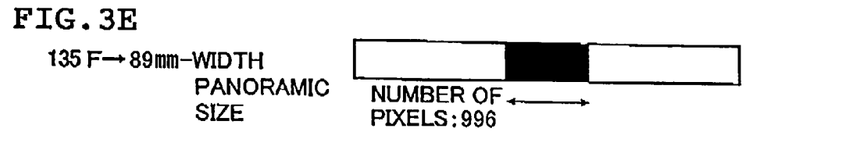
Figure 3F:
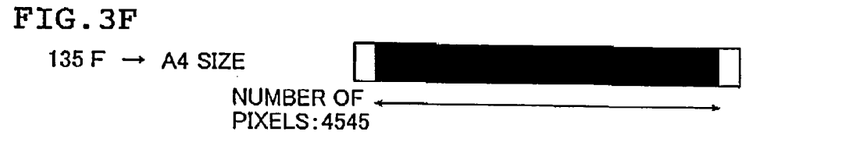
Figure 3G:
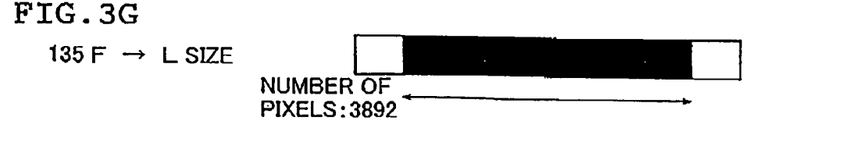

If the film type is the 135F and the print size is the panoramic size as shown in FIG. 3C, the CCD projection area is comprised of 1225 pixels. Thus, an image can be read by using only the intermediate four sections each comprised of j (=436) pixels in the line CCD sensor divided in the above-mentioned manner. In this case, the number of division may be increased to read the projection area of 1225 pixels so as to improve the processing efficiency.

If the film types and the print sizes are 135 film and the 89 mm-width size, 135 film and the 89 mm-width panoramic size, 135 film and the A4 size, and 135 film and the L size as shown in FIGS. 3D–3G, respectively, the CCD projection area is comprised of 1599 pixels, 996 pixels, 4545 pixels and 2892 pixels, respectively. In this case, the time required for reading the pixels can also be reduced by dividing the photodiode array in corresponding manners.

It should be understood, however, that there is no intention to limit the arrangement of sections in the photodiode array to the above-described embodiments. For example, sections each comprised of a small number of (j) pixels (j≦k) may be arranged from the left end of the photodiode array as shown in FIG. 4.

Figure 4:
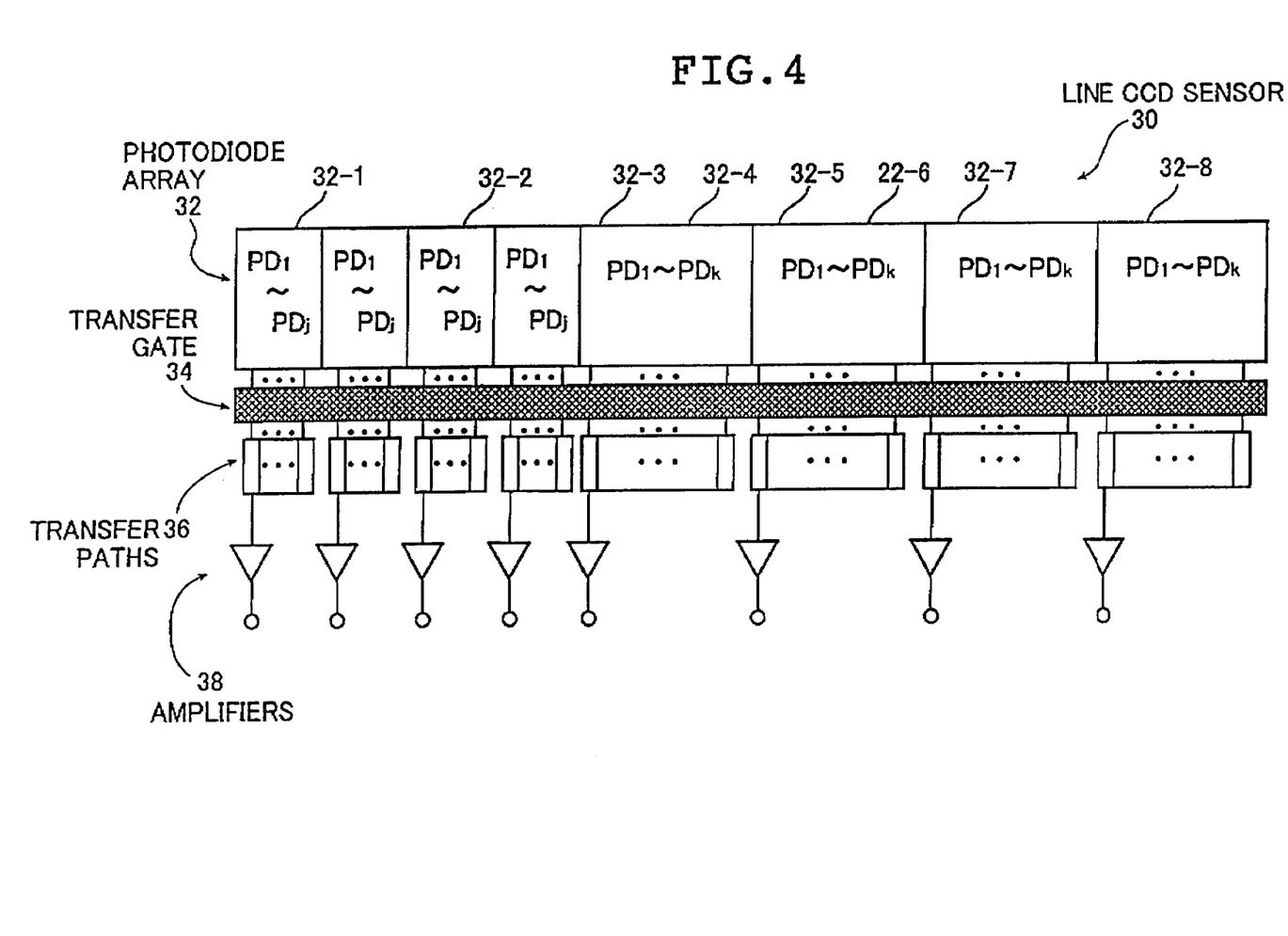
FIG. 4 is a conceptual diagram showing another embodiment of a line CCD sensor according to the present invention.

Specifically, a photodiode array 32 of the line CCD sensor 30 shown in FIG. 4 is divided into eight sections. Four sections 32-1 to 32-4 at the left end are each comprised of a smaller number of pixels j, and four sections 32-5 to 32-8 at the right side are each comprised of a larger number of pixels k.

In this case, the left-side sections each comprised of a small number of pixels are used to read an image projected in a narrow area on the CCD.

In FIG. 4, reference numeral 34 denotes a transfer gate; 36, transfer paths; 38, amplifiers serving as output terminals. They function in the same manner as the transfer gate 24, the transfer paths 26 and the amplifiers 28 serving as the output terminals shown in FIG. 2, respectively. Therefore, a description thereof is omitted here.

As described above in detail, the photodiode array of the line CCD sensor is divided into a plurality of sections differing in the number of pixels, and the respective sections connect to the corresponding transfer paths and amplifiers for reading pixels so that the pixels can be read out in parallel at the same time from the respective sections. Furthermore, the CCD projection area is narrowed, so that an image can be read by using only the sections comprised of a small number of pixels. This further reduces the time required for reading pixels and shortens the cycle of reading pixels in one line.

In this case, if the center of the line CCD sensor is regarded as a reference, the sections each comprised of a small number of pixels are arranged in the vicinity of the center. If the end of the CCD sensor is regarded as a reference, the sections each comprised of a small number of pixels are arranged from the end.

In the above-described examples shown in FIGS. 2 and 4, the transfer paths and the amplifiers are arranged at one side of the photodiode array, but the arrangement may be changed according to a variety of factors such as space restricted by the overall structure of the apparatus. For example, the transfer paths and the amplifiers may alternately be provided at both sides of the photodiode array.

In the above-described embodiment, the line CCD sensor based on the signal transfer system shown in the drawings is given as an example of the divided one-dimensional solid-state imaging device according to the present invention, but it should be understood that there is no intention to limit the invention to it. Any types of one-dimensional solid-state imaging devices may be used insofar as they are one-dimensional solid-state imaging devices divided in the above-described manner. For example, it is possible to use a one-dimensional solid-state imaging device such as a line MOS type sensor based on the addressing system.

The line MOS type sensor based on the addressing system is different from the line CCD sensors 20 and 30 based on the signal transfer system respectively shown in FIGS. 2 and 4 only in that MOS transistors serving as a switching elements (output transistors) are used instead of the transfer gate 24 comprised of electric charge output transistors and that digital shift registers, which select the switching transistor (MOS transistor) of a photodiode from which the stored electric charges are outputted, are used instead of the analog shift registers as the transfer paths 26. Therefore, a description of a preferred embodiment thereof is omitted here.

In addition to the line CCD sensor based on the signal transfer system and the line MOS type sensor based on the addressing system, as the divided one-dimensional solid-state imaging device according to the present invention, a line BBD (Bucket Brigade Device) sensor or the like may be used as the one-dimensional solid-state imaging device based on the signal transfer system. Furthermore, a line CID (Charge Injection Device) sensor, a line PCD (Plasma Coupled Device) sensor or the like may be used as the one-dimensional solid-state imaging device based on the addressing system. Furthermore, a variety of one-dimensional solid-state imaging devices such as a line CPD (Charge Priming Device) sensor having both characteristics of the signal transfer system and the addressing system may be used as the one-dimensional solid-state imaging device.

Referring next to FIGS. 1 and 5–7, there will be described a method of controlling a one-dimensional solid-state imaging device according to the fourth aspect of the present invention and an image reading method using a one-dimensional solid-state imaging device according to the fifth aspect of the present invention.

In the following description, a line CCD sensor is given as a representative embodiment of the one-dimensional solid-state imaging device according to the fourth and fifth aspects of the present invention, but it should be understood that there is no intention to limit the present invention to it.

Figure 5:
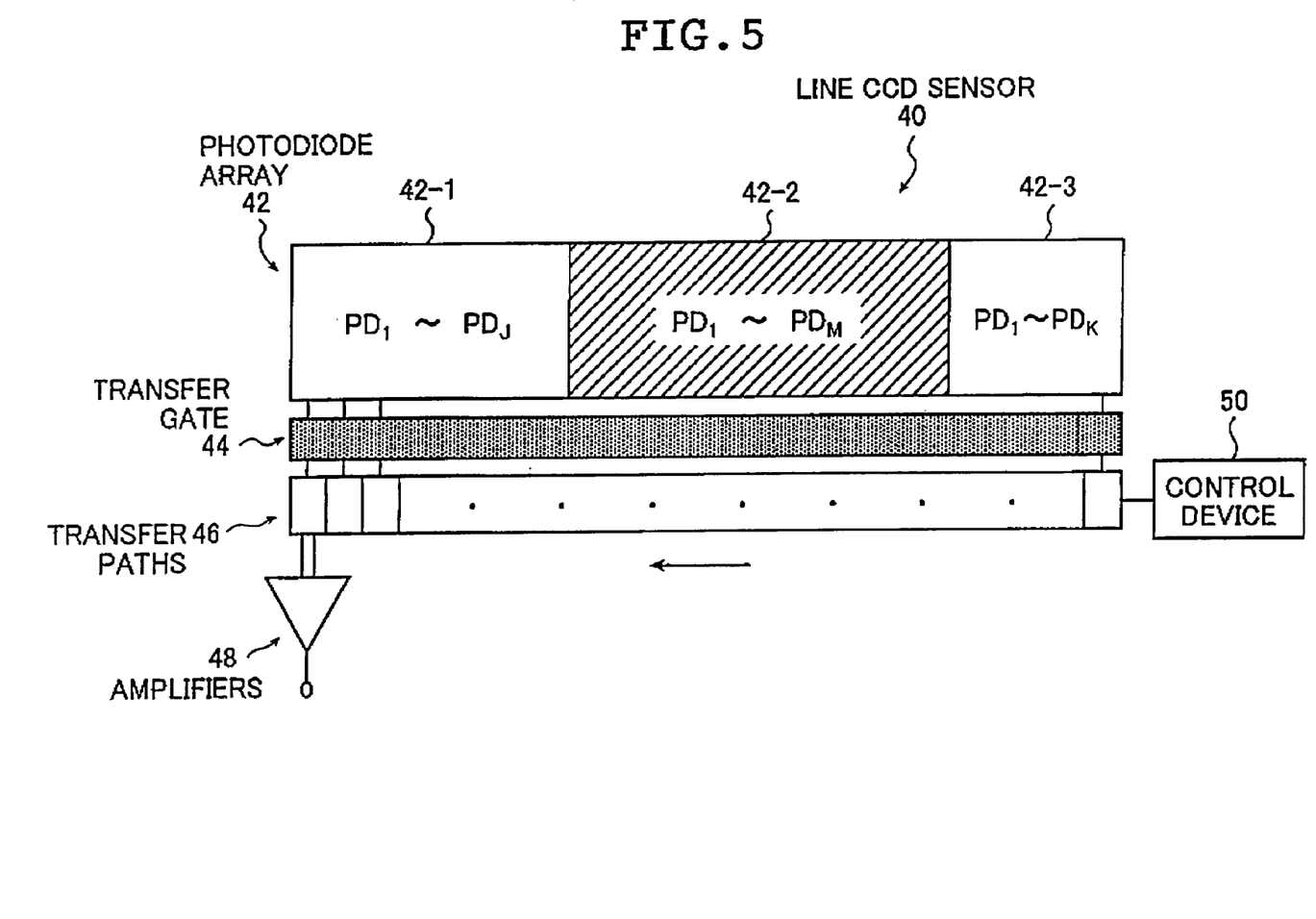
FIG. 5 is a conceptual diagram showing yet another embodiment of a line CCD sensor according to the present invention.

FIG. 5 conceptually shows the structure of a line CCD sensor 40 for use in executing the controlling method according to the fourth aspect of the present invention. The line CCD sensor 40 in FIG. 5 is used instead of the line CCD sensor 20 in the image reading apparatus 10 shown in FIG. 1.

FIG. 5 shows one of three lines of photodiode arrays. All the three lines are constructed in the same manner except for color-separation filters, and therefore, only a photodiode array in one line will be described below.

As shown in FIG. 5, (one line of) the line CCD sensor 40 is comprised of a photodiode array 42, a transfer gate 44, transfer paths 46, and amplifiers 48 serving as output terminals.

The transfer paths 46 connect to a control device 50 that carries out a controlling operation so as to transfer electric charges, read them from the amplifiers 48 and stop the reading.

In the photodiode array 42, a plurality of photodiodes PD is arrayed in a main scanning direction. An intermediate region 42-2 comprised of M pixels is used for imaging, whereas a region 42-1 comprised of J pixels at one side (the left side in the drawing, hereinafter referred to as the first halt region) or a region 42-3 comprised of k pixels at the other side (the right side in the drawing, hereinafter refereed to as the second half region) is not used for imaging.

The number of pixels in the intermediate region 42-2 used for reading an image is determined according to the CCD projection area that depends on the film type and the print size to be read, but no restriction is imposed on the number of pixels in the first half region 42-1 and the second half region 42-3. For example, "J" is equal to or larger than "K".

As is the case with the transfer gates 24 and 34 in FIGS. 2 and 4, the transfer gate 44 in the line CCD sensor 40 in FIG. 5 is used to output electric charges stored in the photodiodes PD in the photodiode array 42 from each of photodiodes PD to the transfer paths 46. For example, the transfer gate 44 is comprised of respective output or shift transistors for outputting electric charges.

The transfer paths 46 are used to transfer the electric charges, which are supplied from the transfer gate (constituted of output transistors) 44 as stated above, to the amplifiers 48 serving as the output terminals. For example, the transfer paths 46 are comprised of analog shift registers.

As is the case with the line CCD sensors 20 and 30 in FIGS. 2 and 4, any types of one-dimensional solid-state imaging devices may be used as the line CCD sensor 40 insofar as they are one-dimensional solid-state imaging devices based on all kinds of signal transfer systems such as the frame transfer system and the inline transfer system.

There will now be described the operation of the line CCD sensor and the image reading apparatus in the case where the line CCD sensor according to a preferred embodiment of the fourth aspect is applied to the image reading apparatus in FIG. 1, the method of controlling the one-dimensional solid-state imaging device according to the fourth aspect of the present invention, and the image reading method using the one-dimensional solid-state imaging device according to the fifth aspect of the present invention.

In the controlling method according to the fourth aspect and the image reading method according to the fifth aspect, the operations by an operator and the operation of the line CCD sensor and the image reading apparatus before the line CCD sensor in the image reading apparatus in FIG. 1 starts reading a photographic film are similar to those in the method of controlling the divided one-dimensional solid-state imaging device according to the second embodiment of the present invention except that the line CCD sensor 40 is used instead of the line CCD sensor 20 in FIG. 1. Therefore, a detailed description thereof is omitted here, and the operation of the line CCD sensor after the start of reading will only be described hereinbelow.

To read an image, an operator sets the photographic film F, and the film carrier 16 mounted at a predetermined position of the image reading apparatus 10 feeds or transports the photographic film F so that a frame with an image to be read can be positioned at a predetermined reading position. Light projected on the photographic film F forms an image on the line CCD sensor 40 (which is provided instead of the line CCD sensor 20).

The CCD projection area varies according to the film type and the print size. If the number of pixels in the CCD projection area is smaller than the number of pixels M in the intermediate region 42-2, only the intermediate region 42-2 is used for imaging whereas the first half region 42-1 and the second half region 42-3 are not used for imaging.

Figure 6A:
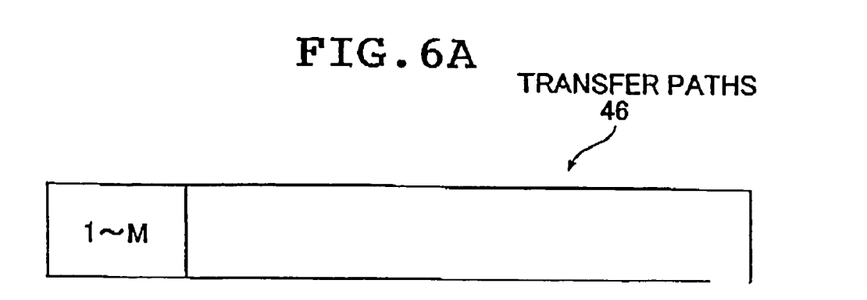
FIGS. 6A and 6B are explanatory views showing how pixels on a transfer path are read out according to the embodiment shown in FIG. 5.

Although only the intermediate region 42-2 comprised of M pixels is used for imaging, the pixels are transferred and read out sequentially from the left-end first half region 42-1 comprised of J pixels in the photodiode array 42. If all the pixels in the first half region 42-1 have been read out, the pixels in the intermediate region 42-2 are sequentially transferred on a pixel-by-pixel basis on the transfer path 46 to the left side in the drawing and are then read out from the amplifier 48. The completion of the readout of M pixels from the intermediate region 42-2 means that the readout of J+M pixels is completed. On this occasion, K pixels in the second half region 42-3 remain at the left side of the transfer path 46 as shown in FIG. 6A.

Since "J" is equal to or larger than "K", the number of remaining pixels is larger than the pixels in the first half region. Thus, the control device 50 stops reading out the pixels so as not to read out K pixels in the second half region. Then, data in the next line are then transmitted to the transfer path 46 through the transfer gate 44.

Figure 6B:
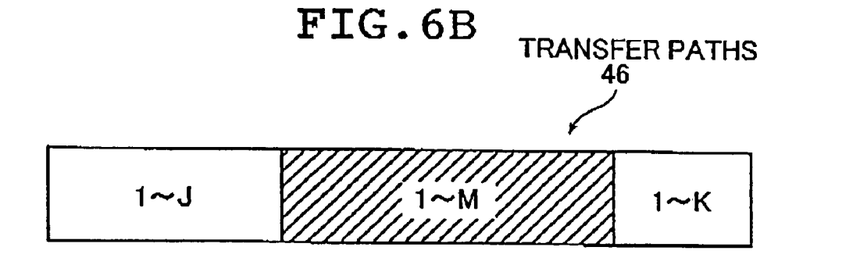

On this occasion, electric charges of K pixels in the second half region 42-3 in the previous line remain untransferred at the left side (the first half) of the transfer path 46 as shown in FIG. 6R. Although the data in the next line is transmitted to the transfer path 46 as shown in FIG. 6B, electric charges of J pixels in the first half region 42-1 in the next line are transmitted to overlap at least an area where the electric charges of K pixels in the previous line remain untransferred because "J" is equal to or larger than "K".

However, the first half region comprised of J pixels is not used for imaging, and thus, electric charges of the remaining K pixels in the first half of the transfer path 46 never affect the image data in the next line.

Thereafter, every time pixels are read out, the pixels in only the first half region comprised of J pixels and the intermediate region comprised of M pixels are read out without reading out the pixels in the second half region comprised of K pixels.

Accordingly, if the time required for transferring on pixel is regarded as P, the time required for reading pixels is shorter than the time required for reading all the pixels N=J+M+K, which represented by the expression $T_0=P \times N=P \times (J+M+K)$, by the time required for reading the second half region. In short, the time required for reading pixels is reduced to $T1=P \times (J+M)$.

Thus, the present embodiment enables the reduction in the time required for reading pixels and the improvement in the processing performance of the apparatus without making any considerable changes to the line CCD sensor 40 itself and leading to increase in cost.

Although "J" is equal to or larger "K" in the above embodiment, it should be understood that there is no intention to limit the present invention to it. "J" may be equal to or smaller than "K". Thus, if "J" is equal to or smaller than "K" as shown in FIG. 7, the time required for reading an image can be reduced as is the case with above example.

Figure 7:
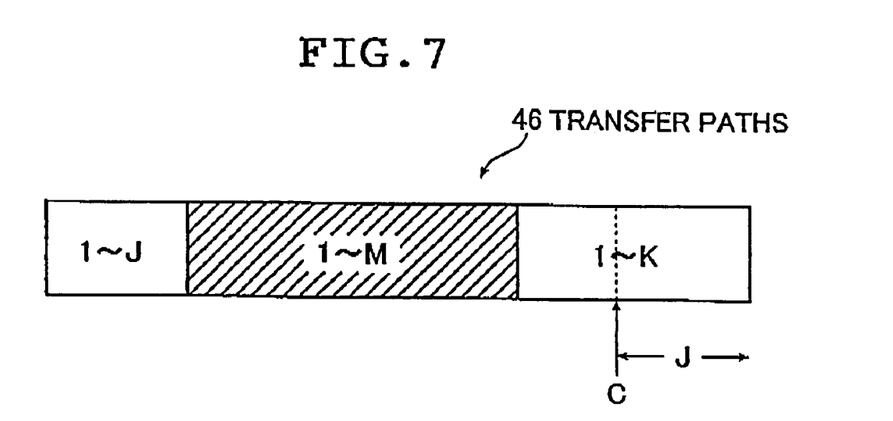
FIG. 7 is an explanatory views showing another embodiment of the present invention.

More specifically, if data shown in FIG. 7 is transmitted to the transfer path 46, J pixels in the left side region and M pixels in the intermediate region are sequentially transferred and read out. In the second half region comprised of K pixels, the readout is stopped when the transfer and readout are completed with at least J pixels being left (as indicated by an arrow C in FIG. 7).

Consequently, the electric charges of last J pixels among the electric charges in the second half region remain untransferred at the left side of the transfer path 46. When data in the next line is transmitted to the transfer path 46, however, the first half region comprised of J pixels in the next line overlap the electric charges of untransferred J pixels but never affects the image data in the intermediate region.

As stated above, every time the pixels are read out, pixels in the same number as a smaller number of pixels between the first half region and the second half region which are not used for imaging are inhibited from being transferred and read out from the second half region. This reduces the time required for reading pixels and the cycle of reading pixels in one line to thus improve the processing efficiency of the apparatus.

The time required for reading and the cycle of reading pixels in one line can be reduced.

In the above description of the embodiment, the line COD sensor based on the signal transfer system is given as an example of one-dimensional solid-state imaging devices, but it should be understood that there is no intention to limit the invention to it. It is possible to use any types of one-dimensional solid-state imaging devices; e.g. a line BBD sensor and a line CPD sensor based on the signal transfer system.

As described above in detail, the present embodiment achieves the reduction in the time required for reading pixels and the cycle of reading pixels in one line and the improvement in the processing efficiency of the apparatus without raising the cost.

The divided one-dimensional solid-state imaging device such as the line CCD sensor and the MOS type sensor, the method of controlling the divided one-dimensional solid-state imaging device and the one-dimensional solid-state imaging device, and the image reading apparatus and method using the divided one-dimensional solid-state imaging device have been described hereinabove by way of preferred embodiments. It should be understood, however, that there is no intention to limit the invention to the specific forms disclosed, but on the contrary, the invention is to cover all modifications, alternate constructions and equivalents falling within the spirit and scope of the invention as expressed in the appended claims.

As described above, according to the first through third aspects of the present invention, the photodiode array of the divided one-dimensional solid-state imaging device such as the line CCD sensor and the MOS type sensor is divided into a plurality of sections comprised of different numbers of pixels, and the respective sections connect to the corresponding transfer paths and amplifiers for reading pixels so that pixels can be read out at the same time from the respective sections. In addition, the image projection range on the solid-state imaging device such as the CCD is reduced, so that only the sections comprised of a small number of pixels are used for imaging. This reduces the time required for reading pixels and the cycle of reading pixels in one line.

As described above, according to the fourth and fifth aspects, pixels in the same number as a smaller number of pixels between the first half region and the second half region which are not used for imaging are inhibited from being transferred and read out from the second half region. This reduces the time required for reading pixels and the cycle of reading pixels in one line and thus improves the processing efficiency of the apparatus.

What is claimed is:

1. A divided one-dimensional solid-state imaging device comprising:
    photodiode arrays having photodiodes for individual pixels arrayed in a line;
    output transistors for outputting electric charges from the respective photodiodes in said photodiode arrays; and
    transfer paths for transferring the electric charges supplied from said output transistors to output terminals,
    wherein each of said photodiode arrays is divided into a plurality of sections differing in the number of pixels in a photodiode arraying direction, the respective sections connecting to the corresponding ones of said transfer paths and said output terminals; and
    pixel rows in the respective sections are read out in parallel at the same time from said output terminals corresponding to the respective sections.

2. The divided one-dimensional solid-state imaging device according to claim 1, wherein:
    said one-dimensional solid-state imaging device is based on a signal transfer system;
    said output transistors constitute a transfer gate; and
    said transfer paths are analog shift registers.

3. The divided one-dimensional solid-state imaging device according to claim 1, wherein said one-dimensional solid-state imaging device is a line CCD sensor.

4. The divided one-dimensional solid-state imaging device according to claim 1, wherein:
    said one-dimensional solid-state imaging device is based on an addressing system;
    said output transistors are switching transistors; and
    said transfer paths are digital shift registers that select the switching transistors for the photodiodes from which the electric charges are outputted.

5. The divided one-dimensional solid-state imaging device according to claim 1, wherein:
    said one-dimensional solid-state imaging device is an MOS type sensor;
    said output transistors are MOS transistors; and
    said transfer paths are digital shift registers that select the MOS transistors for the photodiodes from which the electric charges are outputted.

6. A method of controlling a divided one-dimensional solid-state imaging device comprising: photodiode arrays having photodiodes for individual pixels arrayed in a line;
    output transistors for outputting electric charges from the respective photodiodes in said photodiode arrays; and
    transfer paths for transferring the electric charges supplied from said output transistors to output terminals,
    wherein each of said photodiode arrays is divided into a plurality of sections differing in the number of pixels in a photodiode arraying direction, the respective sections connecting to the corresponding ones of said transfer paths and said output terminals; and
    pixel rows in the respective sections are read out in parallel at the same time from said output terminals corresponding to the respective sections, said method comprising the steps of:
    concentrating the sections comprised of a small number of pixels at one part in an arraying direction of said photodiode arrays; and
    using only the sections with a small number of pixels concentrated at one part in the arraying direction for reading of an image projected in a narrow area.

7. An image reading apparatus wherein:
    a divided one-dimensional solid-state imaging device is used as an image reading section that photoelectrically reads an image recorded on a photographic film,
    said divided one-dimensional solid-state imaging device comprising:
    photodiode arrays having photodiodes for individual pixels arrayed in a line;
    output transistors for outputting electric charges from the respective photodiodes in said photodiode arrays; and
    transfer paths for transferring the electric charges supplied from said output transistors to output terminals,
    wherein each of said photodiode arrays is divided into a plurality of sections differing in the number of pixels in a photodiode arraying direction, the respective sections connecting to the corresponding ones of said transfer paths and said output terminals; and pixel rows in the respective sections are read out in parallel at the same time from said output terminals corresponding to the respective sections.

8. A method of controlling a one-dimensional solid-state imaging device which comprises photodiode arrays having photodiodes for reading individual pixels arrayed in a line, a transfer gate for outputting electric charges from the respective photodiodes in said photodiode array, and transfer paths for transferring the electric charges supplied from said transfer gate to output terminals, said method comprising:

using only an intermediate region of said photodiode arrays for imaging without using regions at one end side and the other end side of said photodiode arrays;

reading out pixels first from the region at the one end side and next from the intermediate region, and stopping reading out pixels in the region at the other end side at a point where pixels in the same number as or smaller number than pixels in the region at the one end side of said photodiode arrays are remained, thereby eliminating need for reading out all pixels in said photodiode arrays;

outputting electric charges from respective photodiodes via switching transistors; and transferring the electric charges from the switching transistors along transfer paths comprising digital shift registers which select the switching transistors for the photodiodes from which the electric charges are outputted, and wherein said one-dimensional solid-state imaging device is based on an addressing system.

9. The method of controlling the one-dimensional solid-state imaging device according to claim 8, wherein:

said one-dimensional solid-state imaging device is an MOS type sensor;

said output transistors are MOS transistors; and said transfer paths are digital shift registers that select the MOS transistors for the photodiodes from which the electric charges are outputted.

10. The method of controlling the one-dimensional solid-state imaging device according to claim 8 or 9, wherein: said one-dimensional solid-state imaging device is a line CCD sensor.

11. A method of reading an image exposed on a photographic film, comprising:

reading an image by a one-dimensional solid-state imaging device controlled by a method of controlling said one-dimensional solid-state imaging device which comprises photodiode arrays having photodiodes for reading individual pixels arrayed in a line, a transfer gate for outputting electric charges from the respective photodiodes in said photodiode array, and transfer paths for transferring the electric charges supplied from said transfer gate to output terminals, said method comprising:

using only an intermediate region of said photodiode arrays for imaging without using regions at one end side and the other end side of said photodiode arrays; and reading out pixels first from the region at the one end side and next from the intermediate region, and stopping reading out pixels in the region at the other end side at a point where pixels in the same number as or smaller number than pixels in the region at the one end side of said photodiode arrays are remained, thereby eliminating need for reading out all pixels in said photodiode arrays;

wherein the transfer gate comprise switching transistors; and said transfer paths are digital shift registers which select the switching transistors for the photodiodes from which the electric charges are outputted, and wherein said one-dimensional solid-state imaging device is based on an addressing system.

12. The method of reading the image according to claim 11, wherein:

said one-dimensional solid-state imaging device is an MOS type sensor;

said output transistors are MOS transistors; and said transfer paths are digital shift registers that select the MOS transistors for the photodiodes from which the electric charges are outputted.

13. The method of reading the image according to claim 11 or 12, wherein:

said one-dimensional solid-state imaging device is a line CCD sensor.

* * * * *